United States Patent

[11] 3,584,644

| [72] | Inventor | Mayne C. Morken<br>Englewood, Colo. |
|---|---|---|
| [21] | Appl. No. | 759,900 |
| [22] | Filed | Sept. 16, 1968 |
| [45] | Patented | June 15, 1971 |
| [73] | Assignee | Twentieth Century Products Corporation<br>Englewood, Calif. |

[54] TOILET TANK SUPPLY VALVE ASSEMBLY
8 Claims, 5 Drawing Figs.

[52] U.S. Cl............................................ 137/426,
137/432, 137/449, 137/519.5, 251/120
[51] Int. Cl.............................................F16k 15/04,
F16k 31/24, F16k 47/14
[50] Field of Search........................................... 137/426,
529, 414, 432, 449, 519.5; 251/120

[56] References Cited
UNITED STATES PATENTS

| 2,324,084 | 7/1943 | Horner | 137/519.5X |
| 1,261,078 | 4/1918 | Wardel | 251/120 |
| 1,703,295 | 2/1929 | Cary | 251/120 |
| 2,271,419 | 1/1942 | Egan | 251/120X |
| 2,895,707 | 7/1959 | Bailey | 137/414X |
| 3,144,874 | 8/1964 | Goldtrap | 137/414 |
| 3,447,562 | 6/1969 | Hoffman | 137/414 |

*Primary Examiner*—William F. O'Dea
*Assistant Examiner*—David R. Matthews
*Attorney*—Christel and Bean

ABSTRACT: A check valve incorporated in the base of a ball cock valve assembly to prevent backflow of flush tank water into the potable water supply system. The ball cock valve includes separable upper and lower portions housing the ball cock valve member and the lower portion is connected to a shank at the base of the assembly. The check valve is positioned and held in place by the connection between the lower portion and the shank so as to be located unobtrusively and to allow the assembly to be installed without danger of defeating the antibackflow characteristic. A strainer is combined with a check valve.

INVENTOR
MAYNE C. MORKEN

BY Christel & Bean
ATTORNEYS

TOILET TANK SUPPLY VALVE ASSEMBLY

BACKGROUND OF THE INVENTION

Ball cock valve assemblies ordinarily utilize flush tank filling passage outlets located near the bottom of the flush tank in order to minimize noise of falling water while the tank is being filled. With such an arrangement, however, failure of the supply pressure may allow water from the flush tank to siphon back into the portable water supply system and, as a consequence, an increasing demand is being felt by the industry to eliminate this potential source of water pollution.

To this end, antisiphoning ball cock assemblies have been developed in which the ball cock is positioned above the water level in the tank to create an airgap, when the tank is filled and the ball cock is closed, between the ball cock valve seat and the water level in the tank filling passage. A vacuum breaker is then provided within this airgap to prevent any siphoning effect should the water supply pressure fail.

Such an arrangement is entirely effective for the intended purpose provided that the assembly is installed properly. Proper installation, however, requires that an adequate airgap be provided which extends below the vacuum breaker and this, in turn, requires that the vertically standing overflow tube in the tank be cut off at the proper height with relation to the height of the ball cock valve. Due to the fact that there are very many different shapes and sizes of flush tanks requiring different water levels, the antisiphoning back cock valve with its inlet-outlet tubes must be provided in different lengths.

These factors offer no obstacle to proper installation so long as the person is fully conversant with the operating principles involved. Unfortunately, however, many installations are effected by the "do-it-yourself" person who may easily fail to install the proper overflow tube-ball cock combination so as to attain the proper airgap, thereby defeating the intended antisiphoning purpose. Ordinarily, the overflow tube will have to be trimmed in length to attain the proper relationship.

SUMMARY OF THE INVENTION

The above disadvantage is overcome in the present invention by providing a ball cock valve assembly which includes a check valve device in its base or mounting portion.

The presence of the check valve eliminates the necessity for providing an airgap and vacuum breaker, as described above. Thus, any form of ball cock assembly may be used. That is, the ball cock valve may be located above or below the water line, as desired.

Moreover, by providing the check valve in the base of the assembly, and more especially, in the region of the shank which mounts the assembly to the flush tank, the unitiated are unlikely to be aware of its presence and will not be tempted to tamper with this portion of the assembly.

BRIEF DESCRIPTION OF THE DRAWING FIGURES

DESCRIPTION OF THE PREFERRED EMBODIMENT

Figure 1:
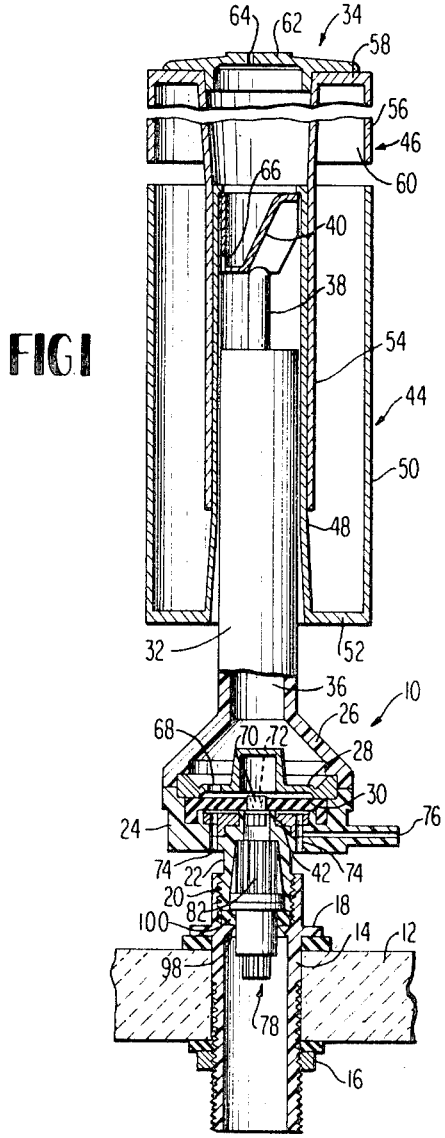
FIG. 1 is a view, largely in vertical section, illustrating a preferred form of ball cock assembly incorporating a check valve according to this invention.

With reference to FIG. 1, a ball cock assembly 10 according to this invention is shown therein mounted in upstanding relation within a flush tank, a portion of the bottom wall of which is indicated by the reference character 12. The ball cock assembly comprises the shank 14 having a threaded lower end for receiving the nut 16 cooperating with the flange 18 on the shank to sandwich the bottom wall of the tank therebetween and thereby rigidly secure the assembly in place. Conventional sealing washers are incorporated as shown.

The upper, female portion 20 of the shank 14 is internally threaded to receive the depending nipple 22 projecting centrally from the lower casing portion 24. The upper casing portion 26 is joined to the lower casing portion 24 and these casing portions clamp the circumferential margins of the member 28 and the flexible diaphragm inlet valve 30 therebetween. The upper casing portion 26 is provided with a tubular extension 32 which acts as a guide for the float assembly 34 and forms a pressure chamber 36 for controlling the inlet valve 30. Normally, the chamber 36 is closed by means of a valve controlling a passage through the upper end of casing extension 32, the valve being spring-urged or floating into closed position and having a stem 38 which projects upwardly from the guide extension 32 and is adapted to be deflected by the cam member 40 incorporated in the float assembly so that when the float falls the chamber 36 is vented to allow the diaphragm valve to move away from the seat 42, as will be apparent presently.

The float assembly 34 incorporates a water chamber portion 44 and an air chamber portion 46, the water chamber portion 44 being formed to provide generally concentric cylindrical skirt portions 48 and 50 joined by the bottom wall 52 and open at the top, the inner skirt portion 48 being slidably received on the guide 32 and allowing the float assembly to rise and fall with respect thereto. The previously mentioned cam member 40 is fitted within the upper extremity of the skirt 48 and will therefrom move into and out of camming relation with the valve stem 38 as the float falls or rises. The air chamber portion 46 is provided with an elongate, depending inner skirt 54 which is snugly engaged on the inner skirt 48 of the water chamber portion in slidable telescoping relation so that the two portions 44 and 46 rise and fall as a unit with the water level in the flush tank but are capable of relative extension to adjust the water level to the required height within the flush tank.

The shorter outer skirt 56 of the air chamber portion 46 is joined to the inner skirt 54 by the annular wall 58 to form the air pocket 60 and a venting end cap 62 provided with a vent opening 64 caps the assembly. The camming member 40 is provided with a vent opening 66 which permits the chamber 36 to be vented when the valve stem 38 is deflected. Stem 38 is canted by member 40 to crack open the valve.

The pressure chamber 36 communicates with the upper side of inlet valve 30 by means of an opening 68 in the transverse wall member 28 and the central region of the valve 30 is provided with a member 70 having a pressure equalizing passage 72 which permits the chamber 36 to build up to the water supply line pressure when the cam member 40 moves upwardly away from the valve stem 38 and allows the pressure chamber 36 to become closed. When the pressure chamber 36 builds up to the supply line pressure, the diaphragm 30 will be forced downwardly against its seat 42 to prevent inlet water from passing across the valve seat. Chamber 36 is open to supply line pressure in all positions of valve 30.

Thus, when the tank is flushed, and the float falls to vent the chamber 36, the water supply pressure will lift the valve 30 from its seat 42 and allow the water to pass through the shank 14, across the valve seat for discharge through the tank filling passages 74 provided in the lower casing portion 24 whereby to fill the tank. There is also provided an overflow tube passage 76 which is connected through a conduit (not shown) extending to and discharging into the open upper end of the conventional overflow pipe. As is conventional, the purpose of the passage 76 is to allow water to be directed to the bowl while the flush tank refills. As soon as the tank refills and the float moves out of camming relationship with the valve stem 38, the pressure in the chamber 36 builds up once again to close the valve 30.

Failure of the water supply pressure would allow the pressure in chamber 36 likewise to decrease and water in the tank might then drain back through the passages 74, across the valve seat 42 and into the supply line connected to the lower end of the shank 14 if there were any failure in diaphragm 30. While this is unlikely to occur, it represents a potential pollution hazard. To overcome this, a check valve indicated generally by the reference character 78 is provided within the base of the valve assembly and this check valve is conveniently positioned in back-to-back relationship to a pressure reducing insert member 82 seated within the nipple 22 as shown. Member 82 can assume a variety of forms, comprising in the illustrated embodiment a tubular body defined by a series of circumferentially spaced bars closed across the downstream end thereof and having an external annular flange around the upstream end thereof, the bars defining a plurality of restricted lateral passages.

As may be seen more clearly in FIGS. 2—5, the check valve includes a tubular main body portion 84 having an inwardly stepped bottom wall 86 presenting an annular valve seat 88 from which extends a plurality of bars 90 defining lateral passages 92 acting as strainer passages to prevent the ingress of foreign material into the valve assembly, the lower extremities of the bars 90 being joined to the end wall portion 94. Passages 92 comprise slots in a cylindrical tube closed at its lower end by wall 94.

The upper end of the body 84 terminates in a seating flange 96 which cooperates with an internal shoulder 98 in the shank 14 for interposition therebetween of a suitable sealing washer 100 as may be seen in FIG. 1.

Figure 5:
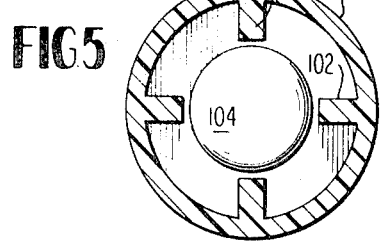
FIG. 5 is a transverse section of the upper portion of the check valve, as indicated by section line 5-5 in FIG. 3.
Figure 2:
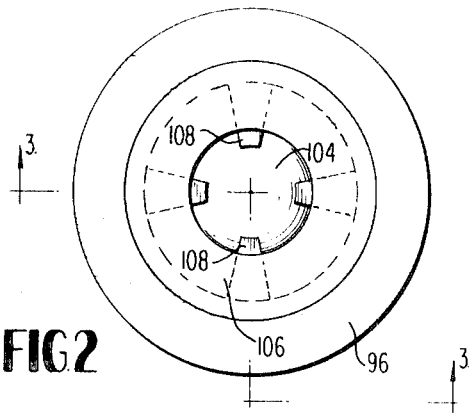
FIG. 2 is an enlarged top plan view of the check valve.
Figure 3:
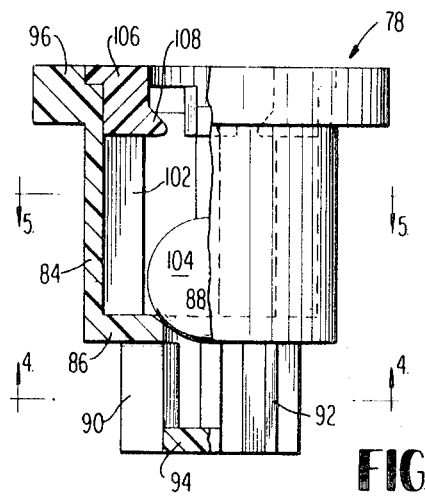
FIG. 3 is a view of the check valve taken along the section line 3-3 in FIG. 2.
Figure 4:
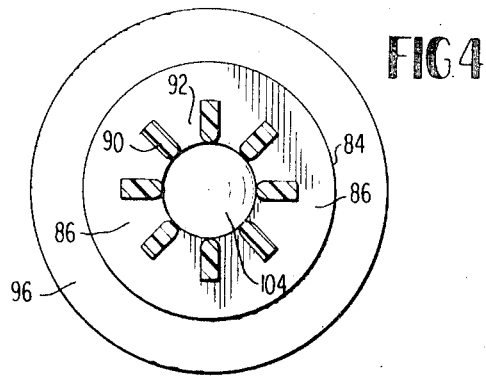
FIG. 4 is a transverse section of the lower portion of the check valve, as indicated by section line 4-4 in FIG. 3.

As may be seen in FIGS. 3 and 5, the main body 84 is provided with a series of circumferentially spaced ribs 102 which effect a caging action for the ball valve element 104, allowing it to rise and fall with respect to its seat 88 and the upper extremity of the body 84 receives an insert ring 106 having a series of circumferentially spaced stop finger portions 108 to limit the upward travel of the ball 104. Ribs 102 are so dimensioned, relative to the diameter of ball 104, as to constrain the latter against substantial wobbling while permitting it to rise and fall freely. In this way, a very quiet action is assured. Water can flow freely into the lower casing portion 24 through the spaces provided between ribs 102, and between stop fingers 108. However, ball 104 engages seat 88 to prevent reverse flow.

Therefore, with the assembly as shown ball valve 104 rises and allows water to enter casing portion 24 when valve 30 is open. When valve 30 is closed, ball 104 lowers, remaining in suspension or seating at 88 as shown in FIG. 3. If the supply line pressure fails, ball 104 immediately falls to its seat 88 whereby failure of supply line pressure cannot cause the contents of the flush tank to drain into the portable water supply system even if valve 30 should fail. The normal rising and lowering of ball 104, and accompanying turning thereof, keeps the ball free for instant seating against reverse flow.

The details of the ball cock valve, per se, are in accord with the construction shown in the Goldtrap U.S. Pat. No. 3,144,874 of Aug. 18, 1964 but it will be appreciated that other and different types of ball cock valves may be utilized. In any event, the check valve is incorporated in the base of the ball cock assembly so that there is little likelihood that an uninitiated person will have cause to tamper with it. More importantly, the presence of the check valve assures that pollution of the water supply will not occur and does not depend upon specialized installation procedures which may not be followed by persons having no particular knowledge of the installation requirements.

The entire ball cock can be fabricated of noncorrosive plastic materials, although rubber gaskets can be used, thereby providing a long and trouble-free life. A simple but dependable positive acting check valve is provided, and the entire assembly is easy to install, can be used in a wide variety of tanks, and is extremely quiet in operation.

Ball 104 is made of a material having a density slightly greater than that of water, with the result that ball 104 rises easily and immediately upon opening valve 30, thereby avoiding constriction across seat 88 and allowing water to flow freely and quietly around ball 104.

Contrary to what might be expected, it has been found that a ball cock such as that illustrated provided with a check valve following the teaching of this invention is noticeably quieter in operation than the same ball cock without my check valve arrangement.

While only one embodiment has been disclosed in detail herein, that has been done by way of illustration and I do not thereby intend that my invention be limited thereto.

What I claim is:

1. A ball cock valve assembly comprising, in combination, a tubular shank for connection to a portable water supply and adapted for mounting the assembly in upstanding relation within a flush tank, a valve body having upper and lower portions and a valve member housed between such portions, said lower portion being removably secured to and in communication with said shank for receiving supply water therefrom, said valve body having a water outlet adjacent said shank for silent filling of an associated flush tank, float means for controlling said valve member, and a noise-free check valve positioned between said lower portion of the valve body and said shank upstream of said valve member for preventing backflow of water through said shank, said check valve comprising a tubular body portion having an inlet valve seat and a ball valve element movable against said seat, said body portion being provided with circumferentially spaced ribs caging said ball valve element and constraining the same against undue lateral wobble during rising and falling thereof relative to said inlet valve seat, said lower portion of said valve body includes a depending portion engaging said shank, and a pressure reducing member seated within said depending portion, said check valve being positioned against said pressure reducing member on the upstream side thereof.

2. The ball cock valve assembly as defined in claim 1 wherein said upper portion of said valve body includes a vertical extension guiding said float means.

3. The ball cock valve assembly as defined in claim 2 wherein said float means includes a water chamber portion slidably guided on said extension, and an air chamber portion vertically adjustable with respect to said water chamber portion to adjust the water level within an associated flush tank.

4. The ball cock valve assembly as defined in claim 1, wherein said lower portion of said valve body includes a depending nipple portion engaging said shank, said check valve extending from the lower end of said nipple portion into said shank and having an external shoulder cooperating with an internal shoulder in said shank.

5. The ball cock valve assembly as defined in claim 1, together with a strainer on said check valve upstream of said inlet valve seat.

6. The ball cock valve assembly as defined in claim 1, together with stop means limiting rising movement of said ball element.

7. The ball cock valve assembly as defined in claim 6, wherein said stop means comprise circumferentially spaced stop finger portions adjacent the upper end of said check valve body portion.

8. The ball cock valve assembly as defined in claim 1, together with a strainer portion comprising circumferentially spaced bars extending from said check valve body portion and defining a plurality of lateral strainer passages around said inlet valve seat upstream thereof, and an end wall closing the upstream end of said strainer portion.